US005825025A

United States Patent [19]

Kerley

[11] Patent Number: 5,825,025

[45] Date of Patent: Oct. 20, 1998

[54] MINIATURIZED TIME-OF-FLIGHT MASS SPECTROMETER

[75] Inventor: Eric L. Kerley, Knoxville, Tenn.

[73] Assignee: Comstock, Inc., Oak Ridge, Tenn.

[21] Appl. No.: 745,372

[22] Filed: Nov. 8, 1996

Related U.S. Application Data

[60] Provisional application No. 60/006,245 Nov. 8, 1995.

[51] Int. Cl. [6] .......... B01D 59/44; H01J 49/00

[52] U.S. Cl. .......... 250/287; 250/288

[58] Field of Search .......... 250/281, 287, 250/288

[56] References Cited

U.S. PATENT DOCUMENTS

| | | | |
|---|---|---|---|
| 4,427,885 | 1/1984 | Takeda | 250/296 |
| 5,070,240 | 12/1991 | Lee | 250/287 |
| 5,117,107 | 5/1992 | Guilhaus et al. | 250/287 |
| 5,300,774 | 4/1994 | Buttrill | 250/287 |
| 5,347,126 | 9/1994 | Krauss et al. | 250/287 |
| 5,654,543 | 8/1997 | Li | 250/287 |
| 5,654,544 | 8/1997 | Dresch | 250/287 |
| 5,661,300 | 8/1997 | Hansen et al. | 250/287 |

OTHER PUBLICATIONS

J.R. Pierce, *Theory and Design of Electron Beams*, 2nd Edition, Van Nostrand, New York (1954).

G. Sanzone, "Energy Resolution of the Conventional Time–of–Flight Mass Spectrometer", *The Review of Scientific Instruments*, v. 41, No. 5, pp. 741–742 (May 1970).

W.A. de Heer and P. Milani, "Large Ion Volume Time–of–Flight Mass Spectrometer with Position–and Velocity–Sensitive Detection Capabilities for Cluster Beams", *The Review of Scientific Instruments*, v. 62, No. 3, pp. 670–677 (Mar. '91).

M.P. Sinha and G. Gutnikov, "Development of a Miniaturized Gas Chromatograph–Mass Spectrometer with a Microbore Capillary Column and an Array Detector", *Analytical Chemistry*, v. 63, No. 18, pp. 2012–2016 (Sep. 1991).

M. Guilhaus, "Spontaneous and Deflected Drift–Trajectories in Orthogonal Acceleration Time–of–Flight Mass Spectrometry", *Journal of the American Society for Mass Spectrometry*, v. 5, pp. 588–595 (1994).

H.L.C. Meuzelaar, "Man–Portable GC MS; Opportunities, Challenges and Future Directions", Center for Micro Analysis and Reaction Chemistry, University of Utah.

*Primary Examiner*—Bruce Anderson

*Attorney, Agent, or Firm*—Pitts & Brittian, P.C.

[57] ABSTRACT

A miniaturized time-of-flight mass spectrometer having a minimized flight path of sample ions between a repeller and a detector in order to minimize the overall size of the time-of-flight mass spectrometer (TOF-MS), thereby requiring a reduced vacuum capacity. The TOF-MS includes an ionizer in which a sample to be tested is placed. An electron gun is provided for emitting electrons through the ionizer to the sample, thus ionizing the sample. An input lens comprising a plurality of electrodes is provided for collimating the ions freed from the sample and directing the collimated ions toward an accelerator region. To reduce lateral velocity spread in the incoming ion beam, the input lens is set to have its input focal point at the point of ionization. A mass spectrometer is provided for detection of the freed ions. A repeller is pulsed to push the ions toward a detector in the TOF-MS. The ions travel through a plurality of grids provided to maintain a linear electric field and into the flight tube. The grids are oriented such that at least the initial portion of the flight path is at a right angle with respect to the ion beam emitted from the input lens. Deflectors are provided within the flight tube for compensating lateral velocity components. The grids are spaced dependant upon the flight path length, and the potentials of each grid are selected such that performance is optimized.

10 Claims, 5 Drawing Sheets

MINIATURIZED TIME-OF-FLIGHT MASS SPECTROMETER

This application claims the benefit of U.S. Provisional Application No. 60/006,245 filed on Nov. 8, 1995.

TECHNICAL FIELD

This invention relates to the field of mass spectrometry. More specifically, this invention relates to a time-of-flight mass spectrometer having flight path that is normal to a stream of ions emitted from an ionizer, with the resulting device being relatively small to accommodate portability thereof

BACKGROUND ART

In the field of mass spectrometry, time-of-flight (TOF) techniques are well known. Typical of those techniques and principles of electron beam characteristics are discussed in the following articles and United States patent:

- Pierce, J. R., *Theory and Design of Electron Beams,* 2nd Edition, Van Nostrand, N.Y. (1954).
- Sanzone, G., *Energy Resolution of the Conventional Time-of-Flight Mass Spectrometer, The Review of Scientific Instruments*, Volume 41, Number 5, 741–2 (May, 1970).
- de Heer, W. A., P. Milani, *Large Ion Volume Time-of-Flight Mass Spectrometer with Position- and Velocity-Sensitive Detection Capabilities for Cluster Beams,* Rev. Sci. Instrum., Volume 62, No. 3, 670–7 (March, 1991).
- Sinha, M. P., G. Gutnikov, *Development of a Miniaturized Gas Chromatograph-Mass Spectrometer with a Microbore Capillary Column and an Array Detector, Analytical Chemistry*, Volume 63, Number 18, 2012-6 (September, 1991).
- Guilhaus, M., *Spontaneous and Deflected Drift-Trajectories in Orthogonal Acceleration Time-of-Flight Mass Spectrometry, Journal of the American Society for Mass Spectrometry*, Volume 5, 588–595 (1994).
- Meuzelaar, H. L. C., *Man-Portable GC/IMS; Opportunities, Challenges and Future Directions*, Center for Micro Analysis & Reaction Chemistry, University of Utah.
- U.S. Pat. No. 5,117,107, entitled “Mass Spectrometer”, issued to M. Guilhaus, et al., on May 26, 1992, for which Reexamination Certificate No. B1 5,117,107 was issued on Sep. 13, 1994.

As can be seen from these disclosures, mass spectrometers are currently being developed to be more compact, dependable, and portable. Instruments operate best in the designed envelope of operation. For example, compact magnetic sector mass spectrometers for targeted ions such as $H^+$ and $H_2^+$have been shown. Most commonly, analytical mass spectrometers are interfaced to chromatographic devices, and efforts have been directed toward solving the problems of this match. Quadrupole mass spectrometers, both linear and trapping versions, have dominated the chromatography/mass spectrometer hyphenated techniques market by virtue of the simplicity, acceptable mass range, unit mass resolution throughout the mass range, well-characterized performance and low cost. These chromatography-mass spectrometry hyphenated techniques include gas chromatography-mass spectrometry (GC-MS) and liquid chromatography-mass spectrometry (LC-MS). Portable GC-MS instrumentation based on linear quadrupole technology is being developed, as discussed by Meuzelaar.

Recently, advancements have been made in chromatography and particularly in gas chromatography. With the use of capillary columns, separations can be performed much faster. However, as separation speed increases and elution peakwidth falls to well below one second, quadrupole mass spectrometers are not capable of scanning the entire mass range rapidly enough to accurately capture the elution profiles for the chromatograph. Quadrupole mass spectrometers typically scan at approximately 2000 amu/sec, which limits a quadrupole mass spectrometer to chromatographic peak widths of several seconds. Provided mass scans are from 10–1000 amu, the reset time of the mass spectrometer is similar to the scan time, and at least three data points are required for each chromatographic peak. One solution to this problem is to maintain the mass spectrometer in selected ion monitoring (SIM) mode where only a single mass of interest is monitored by the mass spectrometer. Detection levels are excellent for this technique, but the user is limited to analyzing species that must be selected before the analysis. Gas chromatography experts report that elution peakwidths could reach widths of ten or fewer milliseconds in the future, and similar trends are affecting LC-MS, as well. Quadrupole instrumentation is inadequate for applications requiring high speed mass spectrometry.

The issue of speed has been partially addressed using a magnetic sector mass spectrometer of Mattauch-Herzog geometry with an imaging focal-plane detector, as disclosed by Sinha. This spectrometer allows sensitive detection of compounds eluted rapidly by gas chromatography, but effective chromatography peakwidths are still limited to a 200 millisecond minimum. In addition, the focal plane detector is fragile and relatively expensive. As well as speed requirements described above, meeting existing demands for mass spectrometers used as detectors for chromatography requires that the mass spectrometer be capable of meeting space and weight requirements for the application. Ideally, versions of the mass spectrometer could be used in both portable and laboratory settings. Further, the mass spectrometer must be rugged and simple. Also, the entire mass spectrum must be effectively scanned at greater than $10^4$ amu/S. Finally, unit mass resolution must be achieved throughout the targeted mass range.

TOF mass spectrometry is best suited for meeting the final three criteria noted above. A typical TOF mass spectrometer is rugged, simple in form and can easily scan at $>10^6$ amu/S. Unit mass resolution across the entire mass range can routinely be obtained for laboratory-scale TOF mass spectrometers. Unfortunately, most laboratory-scale TOF instruments are one (1) meter in length or longer, which is simply excessive for the applications mentioned here. Commercial laboratory-scale TOF mass spectrometers exist for this purpose.

Therefore, it is an object of this invention to provide a linear time-of-flight mass spectrometer that is compact yet capable of meeting the constraints of interfacing with chromatographic techniques.

To this extent, it is an object of the present invention to minimize the flight path of the ions between a repeller and a detector in order to minimize the overall size of the mass spectrometer.

It is also an object of the present invention to provide a time-of-flight mass spectrometer which has a reduced vacuum constraint as a result of the minimized flight path.

A further object of the present invention is to provide a time-of-flight mass spectrometer which is tolerant of spatial and energetic distribution of ions introduced therein.

DISCLOSURE OF THE INVENTION

Other objects and advantages will be accomplished by the present invention which serves to minimize the flight path of the ions between a repeller and a detector in order to minimize the overall size of a time-of-flight mass spectrometer (TOF-MS), thereby requiring a reduced vacuum capacity. The TOF-MS is designed to be tolerant of spatial and energetic distribution of ions introduced therein. The TOF-MS includes an ionizer and a mass spectrometer. A sample to be tested is placed within the ionizer. An electron gun is provided for emitting electrons through the ionizer to the sample, thus ionizing the sample. The ionizer includes an anode within which is defined an ionizing region. An input lens comprising a plurality of electrodes is provided for collimating the ions freed from the sample and directing the collimated ions toward an accelerator region. To reduce lateral velocity spread in the incoming ion beam, the input lens is set to have its input focal point at the point of ionization, thereby providing a paraxial input beam to the accelerator region. The ionizer is unique in that no extraction aperture is used so that ion extraction is very efficient.

After the ion beam drifts into the accelerator region, a repeller is pulsed to push the ions toward a detector in the TOF-MS. The ions travel through a plurality of grids provided to maintain a linear electric field and into the flight tube. The grids are oriented such that at least the initial portion of the flight path is at a right angle with respect to the ion beam emitted from the input lens. Deflectors are provided within the flight tube for compensating lateral velocity components. The grids are spaced dependant upon the flight path length, and the potentials of each grid are selected such that performance is optimized. For the present invention, the time of flight Tis determined by the equation:

$$T = \frac{\sqrt{2\cdot \text{mass}\cdot s}}{\sqrt{q\cdot E_s}} + \frac{\sqrt{2\cdot \text{mass}}\cdot b}{2\sqrt{q\cdot s\cdot E_s}} + \frac{\sqrt{2\cdot \text{mass}}}{q\cdot E_d}\left(\sqrt{q\cdot s\cdot E_s} - \sqrt{q\cdot d\cdot E_d}\right) + \frac{\sqrt{2\cdot \text{mass}}\cdot D}{2\sqrt{q\cdot s\cdot E_s + q\cdot d\cdot E_d}}$$

Definitions of the variables in this equation are given below.

BRIEF DESCRIPTION OF THE DRAWINGS

The above mentioned features of the invention will become more clearly understood from the following detailed description of the invention read together the drawings in which.

BEST MODE FOR CARRYING OUT THE INVENTION

A miniaturized time-of-flight mass spectrometer incorporating various features of the present invention is illustrated generally at 10 in the figures. The miniaturized time-of-flight mass spectrometer, or TOF-MS 10, is designed to minimize the flight path of the ions between a repeller 32 and a detector 42 in order to minimize the overall size of the mass spectrometer 10, thereby requiring a reduced vacuum capacity. Furthermore, the TOF-MS 10 is designed to be tolerant of spatial and energetic distribution of ions introduced therein. The present invention is applicable to TOF-MS's 10 with flight paths of any length. However, flight paths for TOF-MS's 10 of the present invention which have been tested range between 10 cm and 50 cm. It is known that mass resolution improves with mass. Accordingly, the flight path length is chosen based on the amount of space available for the TOF-MS 10. As discussed, decreasing the flight path has the added benefit of relaxing the vacuum constraints on the system, which is a result of the decreased mean free path at higher pressures being compensated by a shorter path length. Calculations discussed below are derived from a TOF-MS 10 having a flight path of 40 cm.

Figure 1:
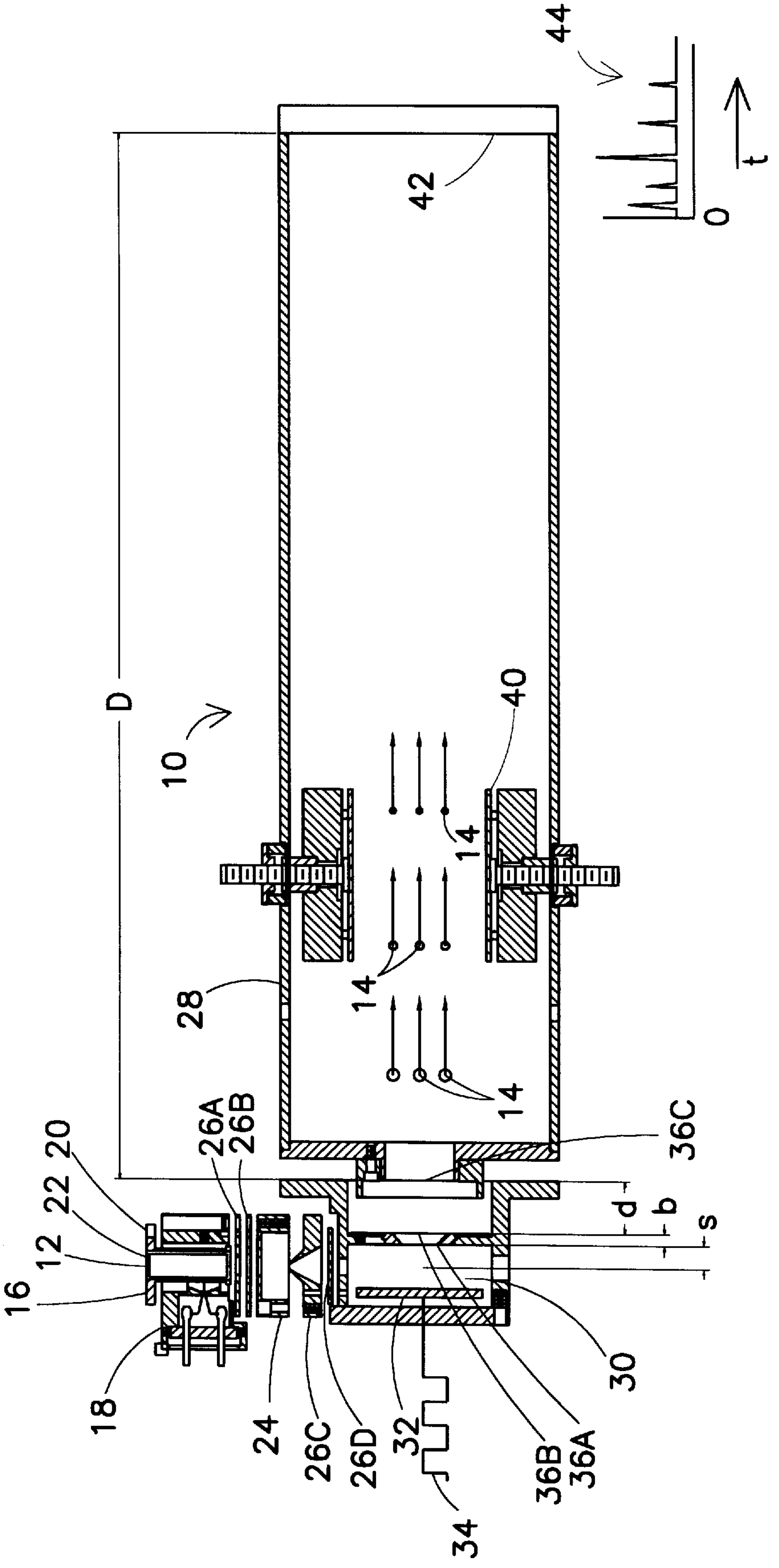
FIG. 1 is a schematic illustration of the miniaturized time-of-flight mass spectrometer constructed in accordance with several features of the present invention showing a linear time-of-flight mass spectrometer.

The TOF-MS 10 of the present invention instrument is depicted schematically in FIG. 1. A sample 12 to be tested is placed within an ionizer 16. An electron gun 18 is provided for emitting electrons through the ionizer 16 to the sample 12, thus ionizing the sample 12. The ionizer 16 includes an anode 20 within which is defined an ionizing region 22. The ratio of the diameters and potentials for the electron gun 18 developed by Pierce, discussed above, for use in vacuum tubes has been adapted for use in the present invention to deliver a well-characterized intense electron beam with minimal hardware. An input lens 24 comprising a plurality of electrodes 26 is provided for collimating the ions 14 freed from the sample 12 and directing the collimated ions 14 toward an accelerator region 30. Illustrated are extractor 26A, focusing element 26B, and first and second collimators 26C,D. The motion of the ions 14 along the TOF-MS axis in either direction with respect to the detector 42 is critical to the performance of the instrument due to the velocity spread, which is known to degrade the resolution in TOF-MS instruments. To reduce lateral velocity spread in the incoming ion beam, the input lens 24 is set to have its input focal point at the point of ionization, thereby providing a paraxial input beam to the accelerator region 30. Using this method, ion beams with lateral temperatures (along the TOF-MS axis) of less than 10 K can be created.

After the ion beam drifts into the accelerator region 30, a repeller 32 is pulsed to push the ions 14 toward a detector 42 in the TOF-MS 10. Because the repeller 32 is pulsed, ions 14 within the accelerator region 30 during a pulse are pushed toward the detector 42. The ions 14 travel through a plurality of grids 36 provided to maintain linear electric fields and into the flight tube 38. The ions 14 sort along the flight path according to mass before striking the detector 42. The ions 14 strike the detector 42 in packets such that lighter ions 14 arrive before heavier ions 14. Impact of the separated ion 14 packets register a signal on the detector 42 that corresponds to pulses in time after the pulse applied to the repeller 32. The quality of the separation of ion 14 packets is optimized by the design of the instrument, namely by unique selections for the location of the grids 36 and the potentials applied to them. These values are derived mathematically below. Illustrated are three grids 36A,B,C. The grids 36A,B,C are oriented such that the flight path is at a right angle with respect to the ion beam emitted from the input lens 24.

Deflectors 40 are provided within the flight tube 38 for compensating lateral velocity components. The grids 36A, B,C are spaced dependant upon the flight path length, and the potentials of each grid 36A,B,C are selected such that performance is optimized. As illustrated, the space between the collimated beam and the first grid 36A, the first and second grids 36A,B, the second and third grids 36B,C, and the third grid 36C and detector 42 are labeled s, b, d and D, respectively.

Variation of initial ion 14 position along the axis of flight, Δs, results in decreased separation of isomass ion packets unless the separations of the grids 36 and the potentials applied to them is chosen correctly. The following mathematical solutions gives these values explicity. Starting with the equation describing the time-of-flight (T) for ions 14 measured with the present invention:

$$T=\frac{\sqrt{2\cdot \text{mass}\cdot s}}{\sqrt{q\cdot E_s}}+\frac{\sqrt{2\cdot \text{mass}}\cdot b}{2\sqrt{q\cdot s\cdot E_s}}+\frac{\sqrt{2\cdot \text{mass}}}{q\cdot E_d}\left(\sqrt{q\cdot s\cdot E_s}-\sqrt{q\cdot d\cdot E_d}\right)+\frac{\sqrt{2\cdot \text{mass}}\cdot D}{2\sqrt{q\cdot s\cdot E_s+q\cdot d\cdot E_d}} \tag{1}$$

where:

s=distance from the ion beam to the first grid 36A, $E_s$=extraction field in the s region, b=length of the field free region between the first and second grids 36A,B, d=length of the high acceleration region between the second and thirds grids 36B,C, $E_d$=acceleration field in the d region, D=flight tube 38 length, $D_b$=distance to the second-order space focus under optimum b conditions, and q=ion charge in coulombs.

The first derivative of Equation (1) with respect to s yields:

$$0=\frac{dT}{ds}=\frac{1}{2}\cdot\frac{\sqrt{2\cdot \text{mass}}}{\sqrt{q\cdot s\cdot E_s}}-\frac{\sqrt{2\cdot \text{mass}}\cdot b}{4\sqrt{q\cdot E_s}\cdot s^{3/2}}+\frac{\sqrt{2\cdot \text{mass}}}{q\cdot E_d}\left(\frac{q}{2}\cdot\frac{E_s}{\sqrt{q\cdot s\cdot E_s+q\cdot d\cdot E_d}}-\frac{1}{2}\cdot\frac{\sqrt{q\cdot E_s}}{\sqrt{s}}\right)-\frac{1}{4}\cdot\frac{\sqrt{2\cdot \text{mass}}\cdot D\cdot q\cdot E_s}{(q\cdot s\cdot E_s+q\cdot d\cdot E_d)^{3/2}} \tag{2}$$

And the second derivative of Equation (1) with respect to s yields:

$$0=\frac{d^2T}{ds^2}=-\frac{1}{4}\cdot\frac{\sqrt{2\cdot \text{mass}}}{s^{3/2}\sqrt{q\cdot E_s}}+\frac{3}{8}\cdot\frac{\sqrt{2\cdot \text{mass}}\cdot b}{\sqrt{q\cdot E_s}\,s^{5/2}}+\frac{\sqrt{2\cdot \text{mass}}}{q\cdot E_d}\left[-\frac{1}{4}\cdot\frac{q^2\cdot E_s^2}{(q\cdot s\cdot E_s+q\cdot d\cdot E_d)^{3/2}}+\frac{1}{4}\cdot\frac{\sqrt{q\cdot E_s}}{\sqrt{s^{3/2}}}\right]+\frac{3}{8}\cdot\frac{\sqrt{2\cdot \text{mass}}\cdot D\cdot q^2\cdot E_s^2}{(q\cdot s\cdot E_s+q\cdot d\cdot E_d)^{5/2}} \tag{3}$$

The second derivative is then solved for D to achieve:

$$D=\frac{2(s\cdot E_s+d\cdot E_d)^{3/2}}{E_s^{3/2}\sqrt{s}}-\frac{b(s\cdot E_s+d\cdot E_d)^{3/2}}{(s\cdot E_s)^{3/2}}+\frac{2\cdot s\cdot E_s}{E_d}-\frac{2(s\cdot E_s+d\cdot E_d)^{3/2}}{\sqrt{s\cdot E_s}\cdot E_d} \tag{4}$$

Equation (4) is substituted for D in Equation (2) and the result is solved for b:

$$b=\frac{2}{3}\cdot s+\frac{2}{3}\cdot\frac{(s\cdot E_s)^{5/2}}{E_d(s\cdot E_s+d\cdot E_d)^{3/2}}-\frac{2}{3}\cdot\frac{s\cdot E_s}{E_d}-\frac{(s\cdot E_s)^{5/2}\cdot D}{(s\cdot E_s+d\cdot E_d)^{5/2}} \tag{5}$$

Following are results from the use of these equations with the following values:

s=0.00418 m

Vs=4.654×10$^4$ Volt/m d=0.00978 m

Ed=3.323×10$^5$ Volt/m

Figure 2:
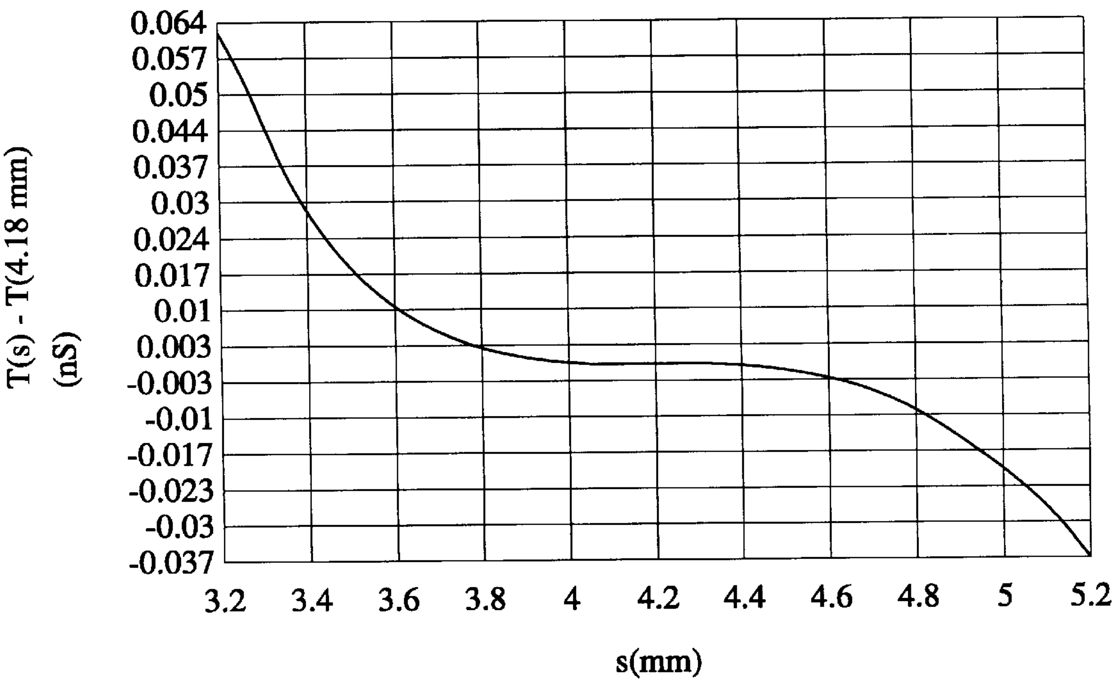
FIG. 2 is a graphical illustration of the variation in the time-of-flight (T) with respect to variations in the distance (s) from an ion beam to the first grid.
Figure 3:
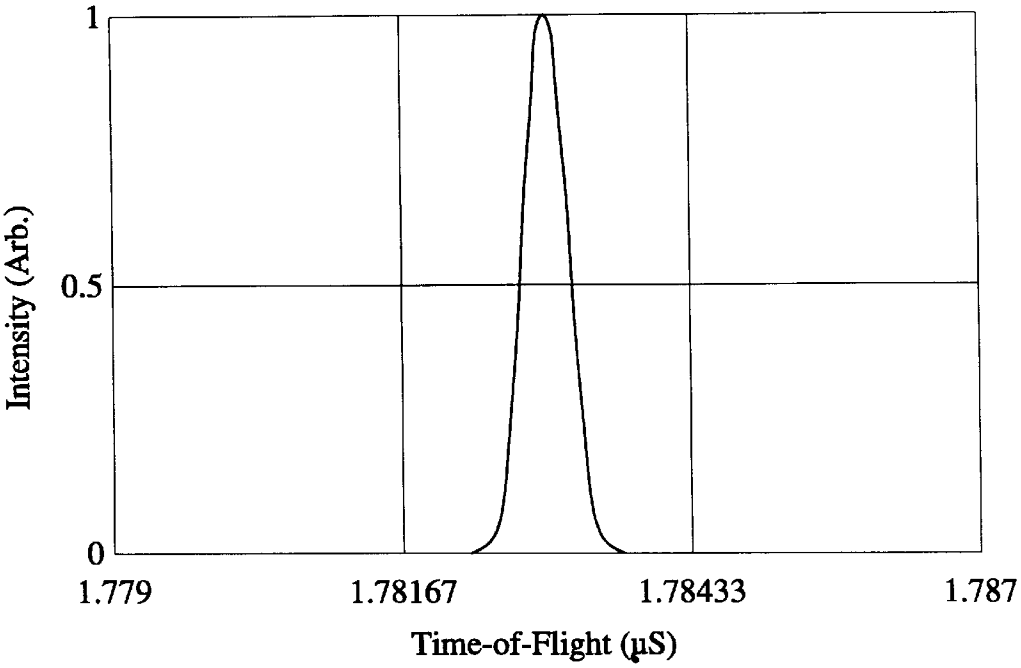
FIG. 3 is a graphical illustration of the estimated performance of the present invention.

D=0.40 m From Equation (5), b=2.098 mm. FIG. 2 illustrates graphically the variation in ion time-of-flight, T(s), with respect to s for 0.0032 m ≦s≦0.0052 m. Using these results and a T=10K Maxwellian energy distribution along the time-of-flight path for ions of mass-to-charge=10, a numerical estimation is performed to estimate the performance of the present invention. The results are graphically presented in FIG. 3. The mass 10 flight time, T, is calculated to be 1.783 microseconds having a peakwidth of 0.76 nS (FWHM. This corresponds to a resolution (m/Δm FWHM=T/2ΔT) exceeding 1000.

Figure 4:
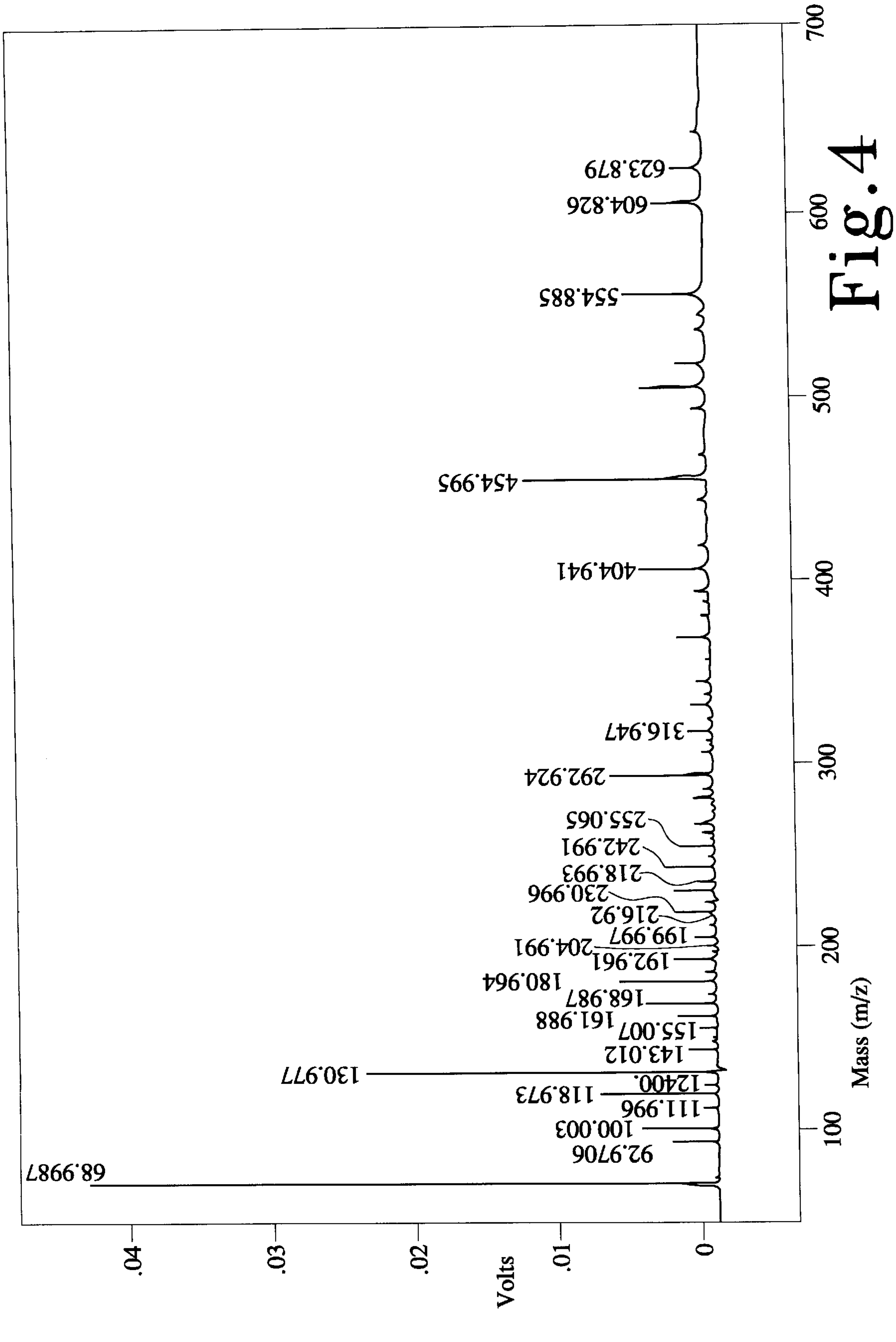
FIG. 4 is a graphical output using the present invention to analyze a test sample perfluorophenanthrene.
Figure 5:
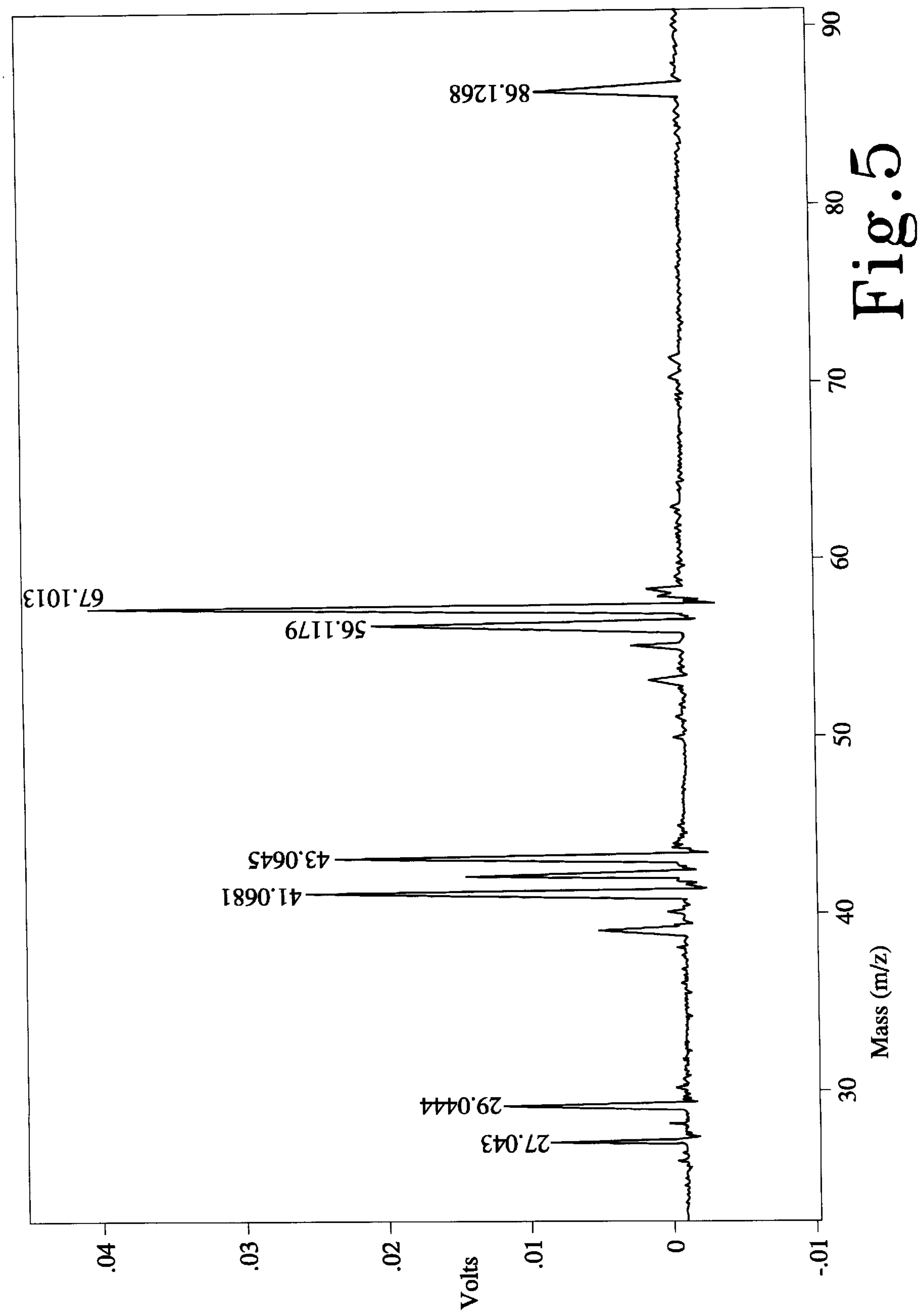
FIG. 5 is a graphical output using the present invention to analyze a test sample of hexane.

As illustrated graphically in the flight tube, ions of various sizes may be detected within a single pulse of the repeller 32. Using the physical law of energy, E=½mv$^2$ (where E is energy, m is mass, and v is velocity), it is understood that lighter ions 14 will travel faster than heavier ions 14. Thus, knowing the energy used to push the ions 14 from the accelerator regions 30, and knowing the length of the flight path, the mass is then determined. A time-based output indicates the presence of any number of ions 14, as indicated by the peaks on the graph 44. The earlier peaks are indicative of lighter ions 14, with the magnitude of the peaks being indicative of the quantity of ions 14 detected. Thus, samples of compounds may be accurately analyzed. FIGS. 4 and 5 illustrate the detected compositions for perfluorophenanthrene and hexane, respectively. The output is displayed as volts versus mass (m/z).

Figure 6:
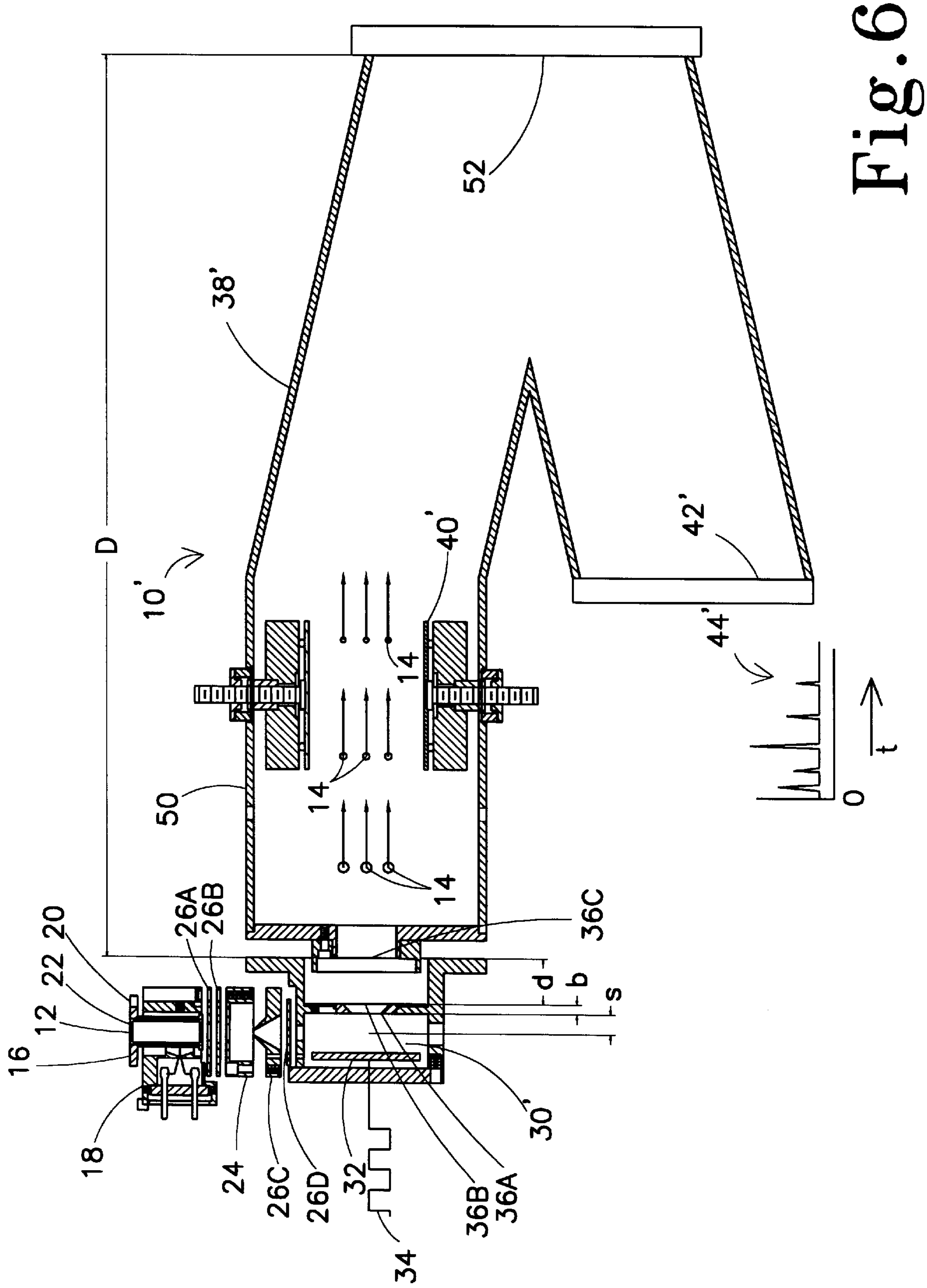
FIG. 6 is a schematic illustration of an alternate embodiment of the miniaturized time-of-flight mass spectrometer constructed in accordance with several features of the present invention showing a reflectron time-of-flight mass spectrometer.

The particular hardware geometry described includes an ionizer 16 and a spectrometer 28. By incorporating the optic configuration described in the ionizer 16, a focused source of ions 14 is formed and subsequently extracted paraxially into the mass spectrometer 28. The mass spectrometer 28 then permits a fivefold decrease in length without sacrifice of mass resolving power. This is accomplished by using properly oriented electrodes set at precisely defined potentials and held at precisely defined spacings. Performance is maintained in the miniaturized instrument because the resulting spectrometer ion optics correct for spatial dispersion of the incident ion beam to a high degree while the ionizer reduces the effects of energy dispersion. While the present invention is described in association with a linear time-of-flight mass spectrometer 28, it will be understood that other spectrometers, such as a reflectron 50, are also acceptable spectrometers. FIG. 6 illustrates a reflectron 50 incorporated in the present invention. As in conventional reflectrons, a reflector 52 is placed in the flight path to reflect the accelerated ions 14 toward the detector 42'.

From the foregoing description, it will be recognized by those skilled in the art that a miniaturized time-of-flight mass spectrometer offering advantages over the prior art has been provided. Specifically, the miniaturized time-of-flight mass spectrometer provides a minimized flight path of the ions between a repeller and a detector such that the overall size of the mass spectrometer is minimized, thereby requiring a reduced vacuum capacity. Furthermore, the present invention is designed to be tolerant of spatial and energetic distribution of ions introduced therein.

While a preferred embodiment has been shown and described, it will be understood that it is not intended to limit the disclosure, but rather it is intended to cover all modifications and alternate methods falling within the spirit and the scope of the invention as defined in the appended claims.

Having thus described the aforementioned invention,

I claim:

1. A miniaturized time-of-flight mass spectrometer for analyzing a sample to determine a composition thereof, said miniaturized time-of-flight mass spectrometer comprising:

an ionizer for receiving the sample and within which the sample is ionized, said ionizer including an input lens having at least one electrode for collimating ions freed from the sample into an ion beam; and a time-of-flight mass spectrometer oriented with respect to said ionizer at a ninety degree (90°) angle, said time-of-flight mass spectrometer including a flight tube, a repeller pulsed to push the ions through said flight tube toward a detector in a flight path oriented with respect to said ionizer at a ninety degree (90°) angle, a first grid spaced a distance s from said ion beam, a second grid spaced a distance b from said first grid, a third grid spaced a distance d from said second grid, and a detector spaced a distance D from said third grid, a time of flight T being determined by a time of flight equation:

$$T = \frac{\sqrt{2 \cdot \text{mass} \cdot s}}{\sqrt{q \cdot E_s}} + \frac{\sqrt{2 \cdot \text{mass}} \cdot b}{2\sqrt{q \cdot s \cdot E_s}} + \frac{\sqrt{2 \cdot \text{mass}}}{q \cdot E_d}\left(\sqrt{q \cdot s \cdot E_s} - \sqrt{q \cdot d \cdot E_d}\right) + \frac{\sqrt{2 \cdot \text{mass}} \cdot D}{2\sqrt{q \cdot s \cdot E_s + q \cdot d \cdot E_d}},$$

wherein a second order correction is accomplished through a second order differential of said time of flight equation in order to determine said distance D, said second order differential being represented by a distance equation:

$$D = \frac{2(s \cdot E_s + d \cdot E_d)^{3/2}}{E_s^{3/2}\sqrt{s}} - \frac{b(s \cdot E_s + d \cdot E_d)^{3/2}}{(s \cdot E_s)^{3/2}} + \frac{2 \cdot s \cdot E_s}{E_d} - \frac{2(s \cdot E_s + d \cdot E_d)^{3/2}}{\sqrt{s \cdot E_s} \cdot E_d}.$$

2. The miniaturized time-of-flight mass spectrometer of claim 1 wherein said ionizer includes an anode within which is defined an ionizing region, the sample being placed within said anode for being ionized.

3. The miniaturized time-of-flight mass spectrometer of claim 1 wherein said ionizer input lens includes a first collimator and a second collimator.

4. The miniaturized time-of-flight mass spectrometer of claim 1 wherein said ionizer input lens defines an input focal point at the point of ionization in order to provide a paraxial input beam to said time-of-flight mass spectrometer.

5. The miniaturized time-of-flight mass spectrometer of claim 1 wherein said time-of-flight mass spectrometer includes at least one deflector for compensating lateral velocity components.

6. The miniaturized time-of-flight mass spectrometer of claim 1 wherein said time-of-flight mass spectrometer is a linear time-of-flight mass spectrometer.

7. The miniaturized time-of-flight mass spectrometer of claim 1 wherein said time-of-flight mass spectrometer is a reflectron time-of-flight mass spectrometer.

8. A miniaturized time-of-flight mass spectrometer for analyzing a sample to determine a composition thereof, said miniaturized time-of-flight mass spectrometer comprising:

an ionizer for receiving the sample and within which the sample is ionized, said ionizer including an input lens including a first collimator and a second collimator for collimating ions freed from the sample into an ion beam, and an anode within which is defined an ionizing region, the sample being placed within said anode for being ionized, said input lens defining an input focal point at the point of ionization in order to provide a paraxial input beam to said time-of-flight mass spectrometer; and a time-of-flight mass spectrometer oriented with respect to said ionizer at a ninety degree (90°) angle, said time-of-flight mass spectrometer including a flight tube, a repeller pulsed to push the ions through said flight tube toward a detector in a flight path oriented with respect to said ionizer at a ninety degree (90°) angle, a first grid spaced a distance s from said ion beam, a second grid spaced a distance b from said first grid, a third grid spaced a distance d from said second grid, and a detector spaced a distance D from said third grid, said time-of-flight mass spectrometer including at least one deflector for compensating lateral velocity components, a time of flight T being determined by a time of flight equation:

$$T = \frac{\sqrt{2 \cdot \text{mass} \cdot s}}{\sqrt{q \cdot E_s}} + \frac{\sqrt{2 \cdot \text{mass}} \cdot b}{2\sqrt{q \cdot s \cdot E_s}} + \frac{\sqrt{2 \cdot \text{mass}}}{q \cdot E_d}\left(\sqrt{q \cdot s \cdot E_s} - \sqrt{q \cdot d \cdot E_d}\right) + \frac{\sqrt{2 \cdot \text{mass}} \cdot D}{2\sqrt{q \cdot s \cdot E_s + q \cdot d \cdot E_d}},$$

wherein a second order correction is accomplished through a second order differential of said time of flight equation in order to determine said distance D, said second order differential being represented by a distance equation:

$$D = \frac{2(s \cdot E_s + d \cdot E_d)^{3/2}}{E_s^{3/2}\sqrt{s}} - \frac{b(s \cdot E_s + d \cdot E_d)^{3/2}}{(s \cdot E_s)^{3/2}} + \frac{2 \cdot s \cdot E_s}{E_d} - \frac{2(s \cdot E_s + d \cdot E_d)^{3/2}}{\sqrt{s \cdot E_s} \cdot E_d}.$$

9. The miniaturized time-of-flight mass spectrometer of claim 8 wherein said time-of-flight mass spectrometer is a linear time-of-flight mass spectrometer.

10. The miniaturized time-of-flight mass spectrometer of claim 8 wherein said time-of-flight mass spectrometer is a reflectron time-of-flight mass spectrometer.

* * * * *